United States Patent [19]

Sugita et al.

[11] Patent Number: 4,547,398
[45] Date of Patent: Oct. 15, 1985

[54] METHOD FOR MANUFACTURING MAGNETIC RECORDING MEDIUM

[75] Inventors: Ryuji Sugita; Toshiaki Kunieda, both of Osaka, Japan

[73] Assignee: Matsushita Electric Industrial Co., Ltd., Osaka, Japan

[21] Appl. No.: 549,633

[22] Filed: Nov. 4, 1983

Related U.S. Application Data

[63] Continuation of Ser. No. 376,234, May 7, 1982, abandoned.

[30] Foreign Application Priority Data

| May 15, 1981 | [JP] | Japan | 56-73710 |
| May 19, 1981 | [JP] | Japan | 56-76242 |
| Dec. 4, 1981 | [JP] | Japan | 56-202215 |
| Feb. 8, 1982 | [JP] | Japan | 57-19232 |

[51] Int. Cl.$^4$ .................................................. H01F 10/02
[52] U.S. Cl. .................................... 427/132; 427/251
[58] Field of Search ......................... 427/128–132, 427/48, 251

[56] References Cited

U.S. PATENT DOCUMENTS

| 3,342,633 | 9/1967 | Bate et al. | 427/251 X |
| 4,220,117 | 9/1980 | Shinohara | 118/718 |

OTHER PUBLICATIONS

*IEEE Transactions on Magnetics,* vol. Mag. 14, No. 5, 9-78, Iwasaki et al., pp. 849–851.

Primary Examiner—Bernard D. Pianalto
Attorney, Agent, or Firm—Burgess, Ryan & Wayne

[57] ABSTRACT

A method for manufacturing a magnetic recording medium is proposed to determine an angle of incidence of vaporized atoms to be not more than 60° at an initial period of formation of a magnetic film by the vapor deposition method on a substrate which is travelling. The magnetic film contains Co and Cr as major constituents and has an axis of easy magnetization normal to the surface thereof.

4 Claims, 7 Drawing Figures

METHOD FOR MANUFACTURING MAGNETIC RECORDING MEDIUM

This application is a continuation of application Ser. No. 376,234, filed May 7, 1982, abandoned.

BACKGROUND OF THE INVENTION

1. Field of the Invention

The present invention relates to a method for manufacturing a magnetic recording medium suitable for a vertical recording system.

2. Description of the Prior Art

A vertical recording system is one of the excellent magnetic recording systems and has excellent short wavelength recording characteristics. In the vertical recording system, a vertically magnetizable recording medium with an axis of easy magnetization extending in the direction perpendicular to a film surface thereof is required. When a signal is recorded on this medium, residual magnetization is oriented in the direction perpendicular to the film surface. Therefore, when a signal of a shorter wavelength is recorded, a demagnetizing field in the medium is reduced, resulting in an excellent reproduction output.

A vertical recording medium having a magnetic layer formed by sputtering on a nonmagnetic substrate directly or through a soft magnetic thin film such as Permalloy has been widely employed. The magnetic layer contains Co and Cr as the major constituents and has an axis of easy magnetization in the direction perpendicular to the film surface. If this magnetic layer contains Cr of not more than about 30% by weight, the crystal system has a hexagonal close-packed structure and the C-axis can be vertically oriented on the film surface. Further, saturation magnetization can be decreased until an anisotropic magnetic field in the vertical direction becomes larger than a demagnetizing field. Therefore, a vertically magnetizable film is manufactured.

However, the rate at which the magnetic thin film is formed is low according to the sputtering method. Thus, the vertically magnetizable film can not be manufactured at low cost. However, in the vapor deposition method including a method for partially ionizing vaporized atoms from a vapor source such as the ion plating method, the present inventor has found that a Co-Cr vertically magnetizable film can be formed quickly at a rate of several 1,000 Å/sec. In the vapor deposition method, the substrate is moved along the circumferential surface of a cylindrical can to form a thin film thereon. Then, a vertically magnetizable tape is manufactured with high productivity.

In order to form a Co-Cr deposition film into a vertically magnetizable film, the C-axis of the hexagonal close-packed structure must orient vertically with respect to the film surface and the anisotropic magnetic field in the vertical direction must be larger than the demagnetizing field. For this purpose, it is found in an experiment that the angle of incidence of vaporized atoms must be controlled with reference to a certain limit in vapor deposition.

SUMMARY OF THE INVENTION

It is, therefore, an object of the present invention to provide a method for manufacturing a magnetic recording medium wherein a Co-Cr vertically magnetizable film is formed by the vapor deposition method on a continuous substrate which is travelling.

According to one aspect of the present invention, there is provided a method for manufacturing a magnetic recording medium wherein an angle of incidence of vaporized atoms at the initial period of formation of a magnetic film on a substrate is not more than 60°. According to this method, the Co-Cr vertically magnetizable film is continuously formed at a high rate.

Other objects, features, and advantages of the present invention will be apparent from the following description of preferred embodiments when taken in conjunction with the accompanying drawings.

DETAILED DESCRIPTION OF THE PREFERRED EMBODIMENTS

Figure 1:
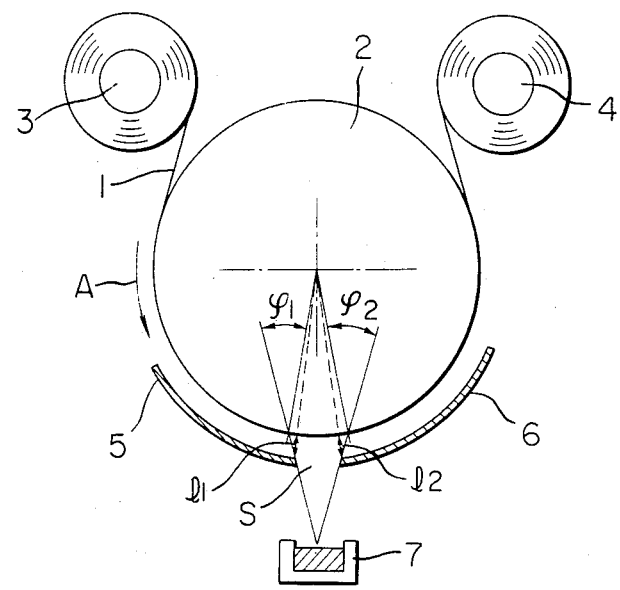
FIG. 1 is a view illustrating the arrangement of a vapor deposition device according to one embodiment of the present invention.

FIG. 1 shows a vapor deposition device according to one embodiment of the present invention. A substrate 1 supplied from a supply roll 3 is fed along the circumferential surface of a cylindrical can 2 in the direction indicated by arrow A. The substrate 1 is then wound on a take-up roll 4. Masks 5 and 6 are disposed between a vapor source 7 and a cylindrical can 2. Vaporized atoms are deposited through a slit S on the substrate 1 which continues to travel. Reference symbol $\psi_1$ denotes an angle of incidence of vaporized atoms at the initial period of formation of a magnetic film. The angle of incidence here means an acute angle formed by a line normal to the film surface and a line parallel to an average incident direction of vaporized atoms deposited on the substrate 1. Reference symbol $\psi_2$ denotes an angle of incidence of the vaporized atoms at the final period of formation of the magnetic layer. The mask 5 shields vaporized atoms having an angle of incidence larger than that of the vapor atoms at the initial period of formation of the magnetic film. Similarly, the mask 6 shields vaporized atoms having an angle of incidence larger than that of the vapor atoms at the final period of formation of the magnetic film. Reference symbol $l_1$ denotes a length between the mask 5 and the substrate 1 and reference symbol $l_2$ denotes a length between the mask 6 and the substrate 1.

Figure 2:
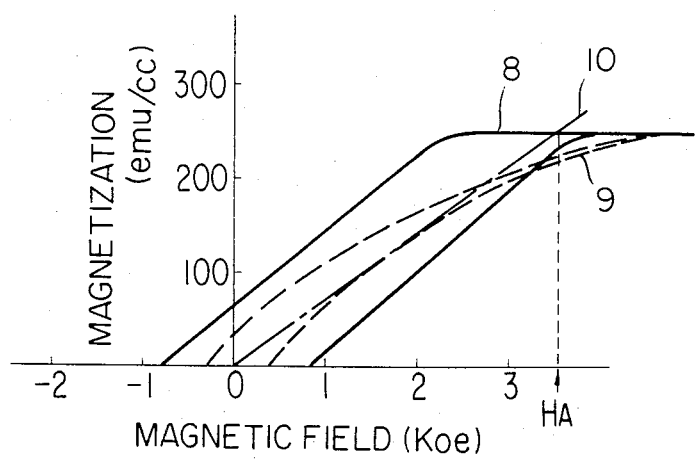
FIG. 2 is a graph of hysteresis curves of a Co-Cr film in order to explain magnetization as a function of a magnetic field.
Figure 3:
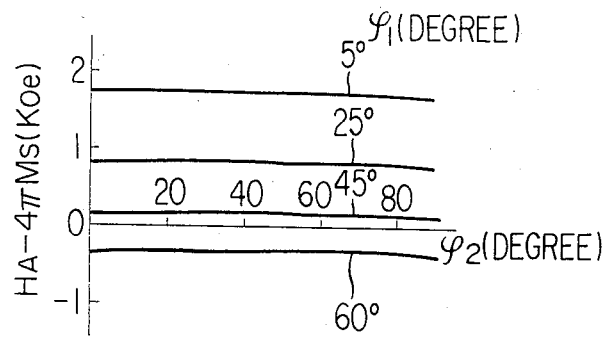
FIG. 3 is a graph for explaining $H_A - 4\pi M_S$ as a function of $\psi_2$ where $H_A$ is the anisotropic magnetic field, $M_S$ is the saturation magnetization and $\psi_2$ is the angle of incidence of vaporized atoms deposited on a substrate at a final period of formation of a magnetic film.
Figure 4:
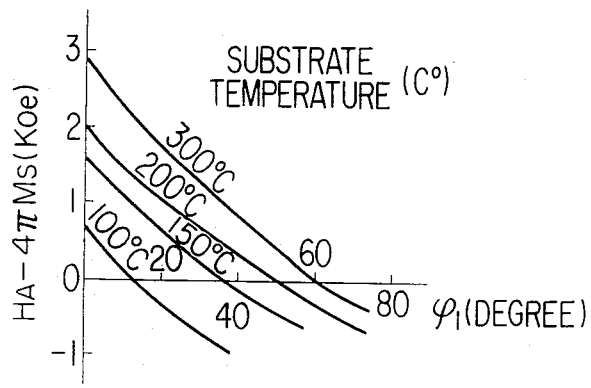
FIG. 4 is a graph for explaining $H_A - 4\pi M_S$ as a function of $\psi_1$ where $\psi_1$ denotes the angle of incidence of vaporized atoms deposited on the substrate at an initial period of formation of the magnetic film.

FIGS. 3 and 4 respectively show measurement results of an anisotropic magnetic field $H_A$ in the direction perpendicular to the film when the Co-Cr film is formed by changing the angle $\psi_1$ of incidence and the angle $\psi_2$ of incidence. The anisotropic magnetic field $H_A$ of the film is measured as follows. FIG. 2 shows hystersis curves of the Co-Cr film. Reference numerals 8 and 9 represent hysteresis magnetization curves showing magnetization perpendicular to the film surface and magnetization parallel to the film surface. The anisotropic magnetic field $H_A$ is defined as an intersection between a tangent 10 to the magnetization curve 9 which includes the origin and the saturation magnetization $M_S$. If the anisotropic magnetic field $H_A$ is larger than $4\pi M_S$, the Co-Cr film is a vertically magnetizable film. FIG. 3 shows a relation between the angle $\psi_2$ of incidence and a difference $H_A - 4\pi M_S$, using the angle $\psi_1$ of incidence as the parameter. If the angle $\psi_1$ of incidence is kept constant, the difference $H_A - 4\pi M_S$ is substantially constant even if the angle $\psi_2$ of incidence is changed from 0° to 90°. When the angle $\psi_1$ of incidence is set to 5°, 25° and 45°, the difference $H_A - 4\pi M_S$ is positive. Thus, the Co-Cr film is the vertically magnetizable film. However, when the angle $\psi_1$ of incidence is 60°, the difference $H_A - 4\pi M_S$ becomes negative. The Co-Cr film is not the vertically magnetizable film. The curves in FIG. 3 are plotted when the temperature of the substrate 1 in the deposition process is set to 200° C. and Cr of 22% by weight is contained in the deposition film.

FIG. 4 shows a relation between the angle $\psi_1$ of incidence and the difference $H_A - 4\pi M_S$, using the temperature of the substrate 1 in the deposition process as the parameter. Assume that the substrate temperature is set to 100° C. The difference $H_A - 4\pi M_S$ becomes positive when the angle $\psi_1$ of incidence is not more than 13°. Therefore, the Co-Cr film becomes the vertically magnetizable film. However, when the angle $\psi_1$ of incidence is more than 13°, the Co-Cr film is not the vertically magnetizable film. When the substrate temperature is set to 150°, 200° and 300° C., the Co-Cr film becomes the vertically magnetizable film when the angle $\psi_1$ of incidence is set to not more than 35°, 50° and 60°, respectively. In the above cases, Cr of 22% by weight is contained in the deposition film. When Cr of 22% by weight is contained in the deposition film, the difference $H_A - 4\pi M_S$ is maximized. However, when the substrate temperature becomes higher than 300° C., the difference $H_A - 4\pi M_S$ is smaller than that at 300° C. Therefore, the angle $\psi_1$ of incidence must be not more than 60° to form the Co-Cr vertically magnetizable film.

As is apparent from the above description, if a high polymer such as a polyimide or polyamide is used as a substrate which can be used at a temperature of about 300° C., the Co-Cr vertically magnetizable film can be obtained when the angle $\psi_1$ of inclination is set to not more than 60°. Although a polyethylene terephthalate substrate made of a polyester type high polymer is cheap and widely used as the magnetic tape substrate, it is decomposed at a temperature as high as 300° C. Polyethylene terephthalate cannot be used as the substrate under discussion, although the polyethylene terephthalate substrate is preferably used as the magnetic tape substrate. According to the experimental results, a Co-Cr film can be deposited on the polyethylene terephthalate substrate at a deposition temperature of 150° C. without damage due to heat. If the angle $\psi_1$ of incidence is not more than 35°, the vertically magnetizable film can be obtained according to the curve corresponding to a substrate temperature of 150° C. in FIG. 4. In other words, if polyethylene terephthalate is used as the substrate, the angle $\psi_1$ of incidence must be not more than 35° to obtain the Co-Cr vertically magnetizable film.

Figure 5:
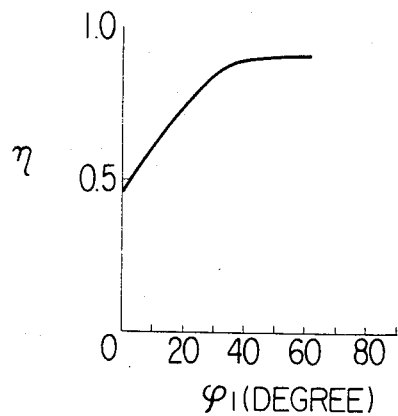
FIG. 5 is a graph for explaining $\eta$ as a function of $\psi_1$ where $\eta$ denotes the deposition efficiency.

However, the angle $\psi_1$ of incidence is preferably large in consideration of productivity of the magnetic recording medium. If the angle $\psi_1$ of incidence is large, the great amount of atom vaporized from the vapor source 7 can be deposited on the substrate 1. A deposition efficiency $\eta$ is increased and productivity is improved. Assume that the angle $\psi_2$ of incidence is set to 60°. The relation between the deposition efficiency $\eta$ and the angle $\psi_1$ of incidence is shown in FIG. 5 in which $\eta = 1$ means that all the evaporated atoms are deposited on the substrate 1. As is apparent from the above graph, the deposition efficiency $\eta$ abruptly increases up to an angle $\psi_1$ of 35° and becomes substantially constant as 0.9 at an angle of more than 35°. If a heat-resistant high polymer material such as a polyimide or polyamide is used as the substrate, the angle $\psi_1$ of incidence can be set to more than 35° and the deposition efficiency $\eta$ is much improved. Thus, the Co-Cr vertically magnetizable film is manufactured with good productivity.

When the Co-Cr film is continuously formed on the substrate 1 which continues to travel in the vapor deposition device shown in FIG. 1, magnetization characteristics of the film only depend on the angle $\psi_1$ of incidence, as is apparent from FIGS. 3 and 4, while they substantially do not depend on the angle $\psi_2$ of incidence. As a matter of fact, if the angle of incidence is large, the deposition efficiency and the productivity are high. Therefore, the angle $\psi_1$ of incidence must be small enough to form the Co-Cr vertically magnetizable film, while the angle $\psi_2$ may be greater than the angle $\psi_1$ of incidence since the magnetization characteristics substantially do not depend on the angle $\psi_2$ of incidence. Thus, the Co-Cr vertically magnetizable film having an excellent deposition efficiency is obtained.

The magnetization characteristics of the Co-Cr film are influenced by the length $l_1$ between the mask 5 and the substrate 1 and the length $l_2$ between the mask 6 and the substrate 1 to be described below. In the experiments described above, the lengths $l_1$ and $l_2$ are respectively 2 cm. Since the lengths $l_1$ and $l_2$ are the same, they are respectively referred to as a length l hereinafter unless otherwise specified.

Figure 6:
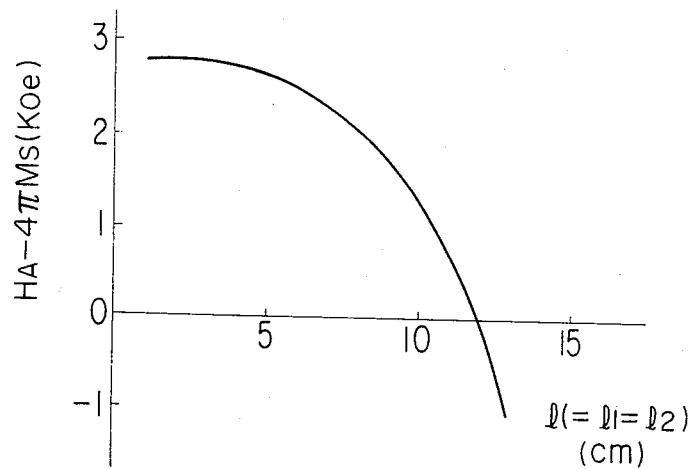
FIG. 6 is a graph for explaining $H_A - 4\pi M_S$ as a function of $l$ where $l$ is the length between a mask and the substrate.

The measured results of the difference $H_A - 4\pi M_S$ of the Co-Cr film when the length l is changed are shown in FIG. 6. The substrate temperature was 300° C., the angle $\psi_1$ of incidence was 0°, and the angle $\psi_2$ of incidence was 20°. If the substrate temperature is set except for 300° C. or if the angle $\psi_1$ of incidence is set to except for 0°, the difference $H_A - 4\pi M_S$ is plotted as a curve the level of which is lower than the curve in FIG. 6. Referring to FIG. 6, when the length l is increased, the difference $H_A - 4\pi M_S$ becomes small. Thus, the length l must be shorter than 12 cm to obtain the vertically magnetizable film. The partial dependence of the difference $H_A - 4\pi M_S$ on the length l may be attributable to the fact that evaporated atoms may not be emitted straight and deposited on the substrate 1. The above results are obtained when the length $l_1$ is the same as the length $l_2$. Even if the length $l_1$ is not more than 12 cm and the length $l_2$ is more than 12 cm, the results are substantially the same as those at the length l. Therefore, the length $l_1$ must be not more than 12 cm to obtain the vertically magnetizable film.

Figure 7:
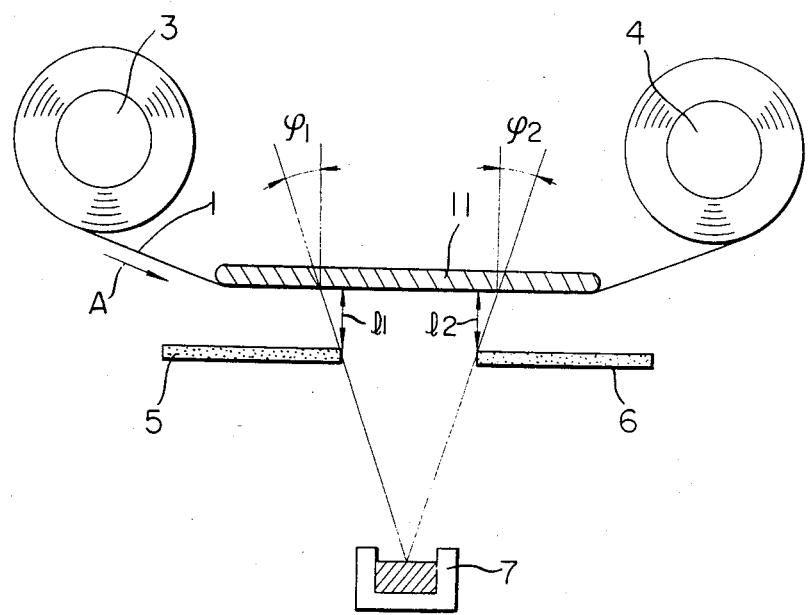
FIG. 7 is a view illustrating the arrangement of a vapor deposition device according to another embodiment of the present invention.

In the above description, the substrate 1 is moved along the circumferential surface of the cylindrical can 2 to form the thin film on the substrate 1. A substantially similar thin film can be obtained when the substrate 1 is moved along a flat plate 11, as shown in FIG. 7. The angle $\psi_1$ of incidence and the angle $\psi_2$ of incidence, and the lengths $l_1$ and $l_2$ are illustrated in FIG. 7. In the above embodiments, one vapor source is used to evaporate Co and Cr. However, since the vapor pressures of Co and Cr differ from each other, it is difficult to form an elongate Co-Cr vertically magnetizable film having a uniform composition. In order to obtain a uniform elongate Co-Cr vertically magnetizable film, Co and Cr are preferably evaporated from separate vapor sources. In this case, since the number of Co evaporated atoms is considerably larger than that of Cr evaporated atoms (cr of about 20 atm. % is preferred in the Co-Cr vertically magnetizable film), the characteristics of the film are substantially determined by the angle of incidence of Co atoms. In the deposition method using one vapor source, the angle of incidence is determined as an acute angle between a line normal to the film surface and a line parallel to the average incident direction of the atoms deposited on the substrate 1. However, in the deposition method using two vapor sources, the angle of incidence is defined as an angle between the line normal to the film surface and a line parallel to the average incident direction of the Co atoms deposited on the substrate 1. The manufacturing conditions used in the method using one vapor source can also be used.

In summary, in the vapor deposition method according to the present invention, the angle of incidence of the evaporated atoms deposited on the substrate is determined properly to continuously form the Co-Cr vertically magnetizable film with an excellent deposition rate.

What is claimed is:

1. A method for forming a magnetic recording medium having a magnetic film containing Co and Cr as major constituents and having an axis of easy magnetization normal to a surface thereof, said method comprising vapor depositing vaporized atoms comprising said magnetic film on a substrate travelling through a deposition zone from an entrance to an exit thereof, the angle of incidence of vaporized atoms with respect to a line normal to the film surface at said entrance being not more than 60°, the angle of incidence of the vaporized atoms with respect to said substrate in an intermediate part of said deposition zone being substantially 0°, and the angle of incidence of the vaporized atoms at said exit being larger than the angle of incidence thereof at said entrance.

2. A method according to claim 1, wherein said angle of incidence in said initial period is not more than 35°.

3. A method according to claim 1, wherein said angle of incidence in said initial period is not less than 35°.

4. A method according to claims 1, 2 or 3, wherein a vapor deposition mask is disposed in the path of said vaporized atoms, the distance between said mask and said substrate being not more than 12 cm, said mask shielding the vaporized atoms of larger incident angles from the vapor sources at the initial period of formation of said magnetic film.

* * * * *